United States Patent
Goldstein et al.

[11] Patent Number: 5,356,487
[45] Date of Patent: Oct. 18, 1994

[54] THERMALLY AMPLIFIED AND STIMULATED EMISSION RADIATOR FIBER MATRIX BURNER

[75] Inventors: Mark K. Goldstein, La Jolla; Jeffrey R. LaBar, Escondido; John C. Bass, La Jolla; Boyd S. Conklin, Carlsbad, all of Calif.

[73] Assignee: Quantum Group, Inc., San Diego, Calif.

[21] Appl. No.: 860,777

[22] Filed: Mar. 27, 1992

Related U.S. Application Data

[63] Continuation-in-part of Ser. No. 636,132, Dec. 31, 1990, Pat. No. 5,281,131, which is a continuation-in-part of Ser. No. 864,088, May 16, 1986, abandoned, and a continuation-in-part of Ser. No. 48,961, May 11, 1987, Pat. No. 4,793,799, which is a continuation of Ser. No. 659,074, Oct. 5, 1984, abandoned, which is a continuation-in-part of Ser. No. 517,699, Jul. 25, 1983, abandoned.

[51] Int. Cl.$^5$ .................. H01L 31/058; F21H 1/00
[52] U.S. Cl. .................. 136/253; 136/248; 431/100; 431/103; 431/253; 431/328; 126/344; 122/4 R; 122/235.11; 122/332
[58] Field of Search ............ 136/253, 248; 431/100, 431/103, 253, 328; 126/344; 122/4 R, 32–34, 235.11, 332

[56] References Cited

U.S. PATENT DOCUMENTS

| | | | |
|---|---|---|---|
| 4,584,426 | 4/1986 | Nelson | 136/253 |
| 4,776,895 | 10/1988 | Goldstein | 136/253 |
| 5,137,583 | 8/1992 | Parent et al. | 136/253 |

*Primary Examiner*—Aaron Weisstuch
*Attorney, Agent, or Firm*—Christie, Parker & Hale

[57] ABSTRACT

A combustion device for producing predetermined radiation spectral output and heat for a variety of applications including lighting, cooking, heating water, electric power generation, and providing inexpensive photons to enhance chemical and physical reactions.

A process for the preparation of a porous ceramic burner is described which comprises drawing a solution which contains metal oxide fibers onto a burner skeleton by use of a vacuum to form a base fiber layer. The base fiber layer is dried, after which an additional metal oxide fiber layer, the outer fiber layer, is added over the base fiber layer. In another embodiment of the invention, an intermediate fiber layer is placed over the base layer, prior to the addition of the outer fiber layer.

The porous ceramic burners prepared in accordance with the present invention comprise a base fiber layer having a low emissivity in the range of the aluminum oxide, gallium oxide, thorium oxide, yttrium oxide, erbium oxide and zirconium oxide, and an outer fiber layer which is thermally stimulated to emit radiation of a specific wavelength above a threshold temperature wherein the burner produces from about 30,000 to about 3,000,000 watts/m$^2$ and less than 20 ppm of NOx. An intermediate fiber layer is used to bond the outer fiber layer to the base fiber layer where desired.

27 Claims, 8 Drawing Sheets

THERMALLY AMPLIFIED AND STIMULATED EMISSION RADIATOR FIBER MATRIX BURNER

REFERENCE

The invention relates to a patent disclosure document 239577 received Nov. 16, 1989 by the U.S. Patent Office.

This application is a continuation-in-part of U.S. patent application Ser. No. 07/636,132, filed Dec. 31, 1990, now U.S. Pat. No. 5,281,131, which is a continuation-in-part of U.S. patent application Ser. No. 06/864,088, filed May 16, 1986 (now abandoned), and also a continuation-in-part of U.S. patent application Ser. No. 07/048,961, filed May 11, 1987, now U.S. Pat. No. 4,793,799, which is a continuation of U.S. patent application Ser. No. 06/659,074, filed Oct. 5, 1984 (now abandoned), which was a national application corresponding to International Application No. PCT/US84/01038 filed Jul. 3, 1984, which was a continuation-in-part claiming priority of U.S. patent application Ser. No. 06/517,699, filed Jul. 25, 1983 (now abandoned).

The application is also related to U.S. patent application Ser. No. 07/695,783, filed May 6, 1991 (now abandoned), and to Disclosure Documents Nos. 156,490 filed on or about Sep. 22, 1986, and 167,739 filed Apr. 13, 1987.

FIELD OF THE INVENTION

The present invention relates to a porous ceramic burner for use in high-heat and photon flux producing devices, which are capable of producing selected and-/or broad wavelength spectral outputs for a variety of applications from lighting, cooking, laser pumps, heating fluids, and producing D.C. power when selected wavelengths are collected onto photovoltaic materials. A method of preparing such porous ceramic burners by differential pressure forming is also provided by the present invention. In addition, methods of raising the temperature of combustion to increase radiation output for increased photon output which may provide higher efficiency electrical production are described.

BACKGROUND OF THE INVENTION

The combustion of natural gas (and other low-molecular-weight gaseous fuels including oil aerosols) to generate other forms of energy is one of the cleanest methods of combustion-based energy conversion. However, in any combustion process, some drawbacks are present. One of the most serious problems is the generation of pollutants, such as oxides of nitrogen. It is well established that nitrogen oxides are a source of ozone generation in the atmosphere and that ozone, along with unburned hydrocarbons, leads to the eventual formation of other components of photochemical smog, such as peroxyacyl nitrates. Current governmental regulations are directed at reducing the $NO_x$ levels that are released into the atmosphere, in an attempt to reduce the occurrence of photochemical smog.

To accommodate these regulations, research has been directed at the development of more efficient burners and catalysts. One group of compounds which have been found to reduce $NO_x$ formation, when low-molecular-weight fuels are burned at high temperature, are the perovskite-type ceramic oxides. These compounds have been shown to reduce the formation of nitrogen oxides during combustion and will be referred to as "superemitting" ceramics. Such materials often have an element present in a mixed oxidation or mixed valence state, forming a nonstoichiometric oxide. Some of the most effective members of this class of compounds are rare earth/alkaline earth oxide systems, rare earth/transition metal oxide systems, and various other mixed metal oxide systems.

Superemitters, when heated to a threshold temperature, emit visible or infrared radiation. Such radiation can be absorbed by a photovoltaic device, such as a silicon cell, to produce output voltage or current. The thermally-stimulated superemitters produce radiation in a relatively concentrated, narrow spectral band compared to blackbody or "grey body" emitters, which typically exhibit a broad band thermal emission. As a result of the concentrated, narrow spectral band, the power generated by a superemitter is greater than that generated by a blackbody emitter.

The thermophotovoltaic device used to collect the radiation is designed so that the superemitter emits radiation of wavelength near the photovoltaic material band gap. For example, silicon has a band gap at about 1,100 nm, and InGaAsP and has a band gap at about 1,300 nm. An ytterbia-based, mixed oxide emission spectrum is compared with that of holmium oxide and with a typical blackbody spectrum in FIG. 1.

Although general fiber matrix burners have been developed, they have generally not been found to be effective at high temperatures to function at over 650,000 watts/m$^2$, producing selected band(s) of radiation as well as producing low $NO_x$ levels, i.e., less than about 20 ppm. Some such burners are capable of operation at a nitrogen oxide emission level of 20 to 30 ppm below 650,000 watts/m$^2$ in both laboratory and field tests. However, when the energy density of such burners is increased to above 650,000, they deteriorate and $NO_x$ emissions increase dramatically.

Therefore, there is a need for a high-energy density burner that produces low $NO_x$ emissions when operating at a high-energy density.

Superemitter ceramic burners, which emit radiation in a narrow spectrum when heated above their threshold temperature offer the potential for such high-efficiency energy production. It is desirable that these superemitter ceramic burners have highly active emissive surfaces and low $NO_x$ and other combustion products. It is also desirable that these superemitters be inexpensive and easy to produce, strong and durable, and have high-temperature and high-energy density capabilities. The intensity of the light emitted from a superemitter increases dramatically with temperature. Therefore, the amount of radiant energy emitted and then collected by the photovoltaic cell will also increase dramatically with temperature.

It is also desirable to produce electric power efficiently. The efficiency of the electric power goes up if the energy in the exhaust gas is recycled by means of a recuperator, which transfers the energy in the exhaust to the air inlet. The recuperator may increase the temperature of the air above the autoignition point. To provide for this important energy feature, a fuel injection system has been invented that allows combustion inlet temperature to reach well over autoignition.

Therefore, there is a need for an improved fiber matrix burner technology for a wide variety of applications in heating, electrical energy generations, cooking, and providing photons of specific wave bands for such purposes as pumping lasers and operating photochemical reactors.

SUMMARY OF THE INVENTION

The invention comprises various devices to produce and concentrate photons onto a target and methods for constructing these devices. A number of examples of novel devices to produce electromagnetic radiation with a predetermined spectral characteristic depending on the specific application are presented.

A process for preparing a porous ceramic burner is also described. The process comprises placing a base fiber layer suspension (consisting of bonding gel, which supports fibers and porosity agents) on one side of a burner skeleton; applying a vacuum to the other side of the burner skeleton to draw the base layer fibers onto the surface of the burner skeleton and to draw the liquid component through the burner skeleton, removing the fiber-coated skeleton from the base fiber layer suspension, and drying the base fiber layer. An outer fiber layer may also be added to the base fiber layer by placing another fiber layer's suspension in contact with the side of a burner skeleton containing the base fiber layer; applying a vacuum to the other side of the burner skeleton, to draw the outer layer fibers onto the surface of the base fiber layer; drawing the liquid component through the base fiber layer and the burner skeleton, to form an outer fiber layer; removing the burner with the outer layer coated onto the skeleton from the outer fiber layer solution; drying the outer fiber layer; and firing the coated burner to sublime out porosity agents and bond the ceramic together to produce a porous ceramic burner.

In another embodiment of the invention, an intermediate fiber layer is placed on the base layer, prior to the addition of the outer fiber layer, by placing an intermediate fiber layer solution on the side of a burner skeleton containing the base fiber layer; applying a vacuum to the other side of the burner skeleton to draw the intermediate layer fibers onto the surface of the base fiber layer; drawing the liquid component through the base fiber layer and the burner skeleton to form an intermediate fiber layer; and applying the outer fiber layer to the intermediate fiber layer.

Porous ceramic burners prepared in accordance with the present invention comprise a base fiber layer which may have a high emissivity such as silicon carbide or a low emissivity such as silicon dioxide, aluminum oxide, gallium oxide, thorium oxide, yttrium oxide, erbium oxide and zirconium oxide, and an outer fiber layer which consists of at least one material that is thermally stimulated to emit radiation of a specific wavelength above a threshold temperature; wherein the burner produces about 30,000 to about 3,000,000 watts/m$^2$ and less than 20 ppm of $NO_x$.

In another embodiment of the invention, the porous ceramic burner further comprises an intermediate fiber layer between the base fiber layer and the outer fiber layer to bond the outer fiber layer to the base fiber layer.

In another embodiment of the invention, the photon generator is designed to focus the emitted light onto a target placed near the center of a cylindrical burner, which consists of an outer chamber to distribute the premixed gas/air inward and further comprising a porous skeleton through which the gas moving toward the center passes further comprising a porous ceramic matrix; the premix gas/air travels through the pores to the surface region of the burner where ignition and combustion take place.

In another embodiment of the invention, the burner contains separate gas (fuel injection) and air inlets into the fiber matrix to allow for preheating of the air to above the ignition temperature. This fuel injection can be used with a number of designs including the cylindrical central focused burner.

BRIEF DESCRIPTION OF THE DRAWINGS

Other features, aspects and advantages of the present invention will be more fully understood when considered with respect to the following detailed description, appended claims, and accompanying drawings where:

DETAILED DESCRIPTION

Figure 1:
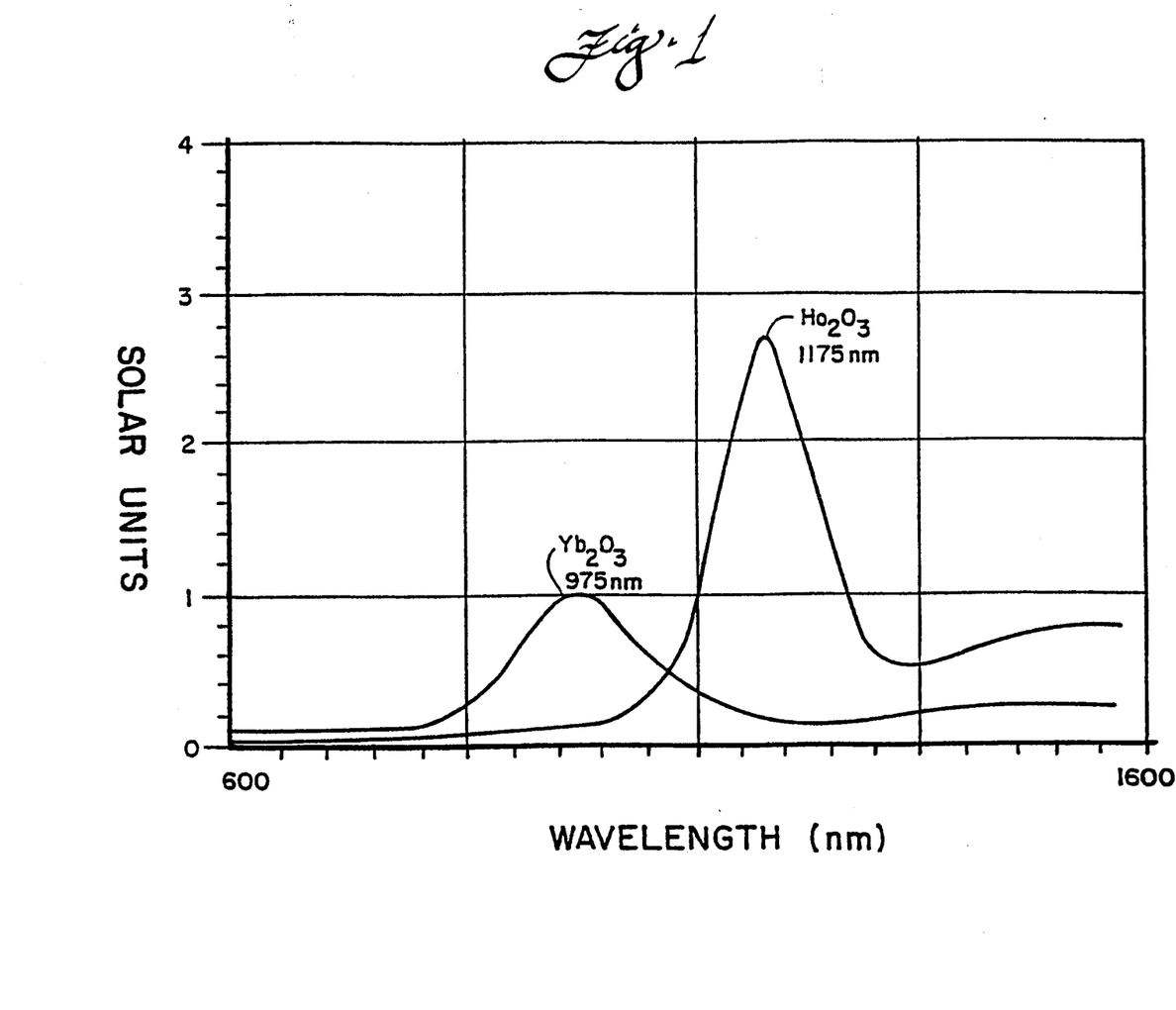
FIG. 1 is a graphical comparison of two superemitters, which show wavelength and intensity.

FIG. 1 illustrates the spectral emittance of two different ceramic superemitters when heated above the thermally stimulated quantum emission temperature using the same amount of gas (1500 BTU).

Figure 2A:
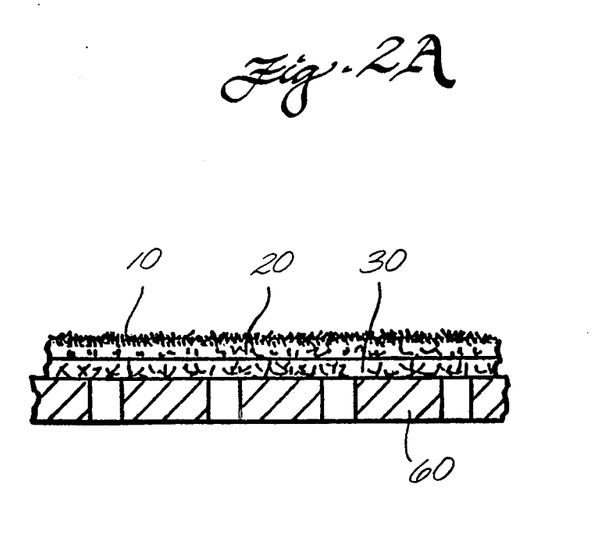
FIG. 2A is a partial longitudinal cross-section of a three layer flat porous ceramic matrix bonded to a punched metal skeleton.
Figure 2B:
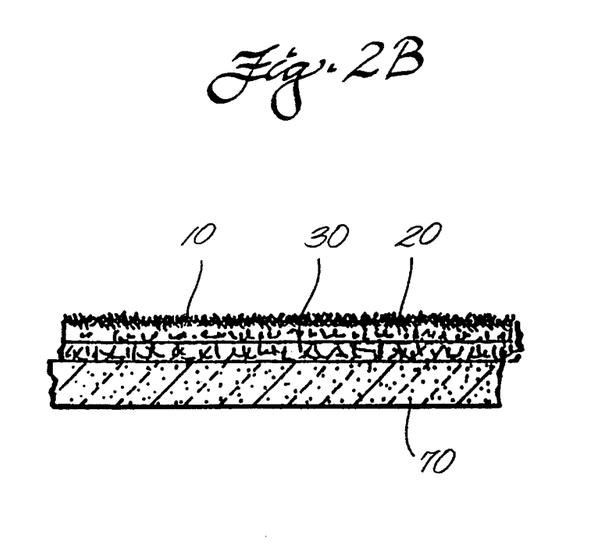
FIG. 2B is the same as 2A except a porous ceramic skeleton is substituted for the punched metal.

The present invention relates to novel porous ceramic burners and methods of preparing such burners. FIG. 2A illustrates the general structural features of a simple flat porous ceramic burner 10 formed by the practice of the invention. The porous ceramic burner comprises a base fiber layer 30, an intermediate fiber layer 20, an outer fiber layer 10, and a "burner skeleton" 60, which may be metal screen, punched metal, or other suitable support material with one or more layers of fiber applied onto the skeleton. A porous ceramic skeleton 70, shown in FIG. 2B, is preferred for high temperature applications.

The base fiber layer may comprise a high temperature fiber such as pure or doped oxides of uranium, thorium, ytterbium, aluminum, gallium, yttrium, erbium, holmium, zirconium, chromium or other high-temperature oxides. The base fiber layer is preferably any low-cost, fiber material that can be bonded effectively, preferably with thermally-stimulated superemitter materials. One of the preferred base fiber layers is of aluminum oxide, which is inexpensive and which lasts longer under oxidative conditions than do other inexpensive materials such as carbides, silicon oxide, or aluminosilicates.

The intermediate layer functions to bond the outer fiber layer to the inner fiber layer. The intermediate fiber layer may be used when aluminum oxide fibers are used for the base fiber layer, and ytterbia is used as the outer fiber layer, since it is difficult to maintain a bond between ytterbia and alumina after thousands of cycles. If fibers other than aluminum oxide, such as yttria, are used for the base fiber layer, the intermediate layer may be omitted. When the intermediate layer is used, it preferably comprises any fiber material which is oxidation resistant and which bonds well to both alumina and ytterbia or alumina and holmium or mixed oxide fibers containing these materials or other suitable materials such as pure or doped uranium, thorium, ytterbium, gallium, yttrium, erbium, holmium, zirconium, chromium or other high-temperature oxide fibers.

The outer fiber layer is preferably a high-temperature superemissive material. The superemitter comprises a material which has an inner electron shell vacancy which upon heating one inner electron below jumps into the hole as described in U.S. Pat. Nos. 4,906,178 and 4,793,799 and 4,776,895, by one of the authors, i.e., perhaps by means of a photon-electron interaction. These patents are herein incorporated by reference. Materials suitable for use as the superemitter are zirconium, yttrium, ytterbium, holmium, thulium, cerium or thorium oxide fibers, or thorium-holmium, aluminum ytterbium-yttrium mixed oxide fibers, or mixtures thereof and other materials that emit radiation by an inner electron shell transition. The use of such materials increases the life, reduces corrosion, and changes the emissivity characteristics of the resultant burner to those desired for a variety of uses such as photovoltaic devices, cooking food, heating water, pumping lasers, reacting materials photochemically, etc.

The method of fabricating such a burner is described below. Fiber may be manufactured or purchased. One manufacturing process is incorporated by reference to U.S. Pat. No. 4,758,003. Another method in which rayon fibers are chopped into short lengths (in the range of from about $\frac{1}{2}$ to about 2 cm) may also be used. The size of the fibers may be from less than 1 $\mu$m to over 100 $\mu$m in diameter. Smaller-diameter fibers are preferred for some applications, since they are more rapidly heated and cooled than are larger-diameter fibers. For example, to make alumina fiber a solution may be formulated with aluminum nitrate. To make superemitting fibers, a solution of ytterbium nitrate, yttrium nitrate, alumina and erbium nitrate are prepared. Any of the rare earth metal or other metal nitrates may be used in appropriate proportions to result in the desired compositions for a particular application. Preferably, the cut rayon fibers are impregnated with a solution that has concentrations of about 1 mg/ml comprising from about 80% to about 99.89% (wt/wt) $Yb(NO_3)_3.6HO_2$, from about 0% to about 3% $Er(NO_3)_3$, from about 0% to about 5% $Ai(NO_3)_3$, and from about 0% to about 8% $Y(NO_3)_3$.

When the fibers are saturated, they are dried and then are treated with ammonia gas to reduce the nitrates. The ammonia reacts with the nitrate to form the hydroxide at about 25° C. (+5° or −5°) and 20% to 80% relative humidity for several hours. In order to carbonize the rayon, the cut fibers are first dried and heated to about 60° C. and then fired at several hundred degrees to slowly oxidize the carbon containing metal to gaseous products.

The fibers are added to a specially prepared gel which serves as a ceramic binder and a transport medium for the vacuum or pressure forming process.

One method for the gel preparation (used to suspend methylmethacrylate (MMA) and alumina fibers) is from an alumina "sol," which is partially reacted with $Ai(NO_3)_3$ to form a viscous gel. The viscosity of this gel is important. The gel must be thick enough to suspend a relatively-large-porosity agent that is used in formulating the burner material. If the gel is too thick, it will entrap air bubbles, thereby producing burners of poor quality. Preferably, the viscosity is maintained so as to just suspend the fibers and MMA.

One example of a gel is Gel #1, comprising Alumina Sol AL-20 (AL-20) supplied by Nyacol, a subsidiary of PQ Corp, water, and aluminum nitrate (60% $Al(NO_3)_3.9H_2O$ by weight solution from Mineral Research Corp.), and is prepared by adding about 200 ml of AL-20 per liter of water. The mixture is stirred for about 5 minutes, after which time about 42 ml of aluminum nitrate, for each liter of water, is slowly added to the diluted AL-20 solution, while the mixture is stirred, at the rate of about 1 ml/sec or less. After the addition of the aluminum nitrate is complete, alumina fibers sold under the trade name "SAFFIL", which may be purchased from ICI Americas Inc. of Wilmington, Delaware, may be added and a porosity agent is added. About 20 grams of alumina fibers are wetted with about one liter of liquid gel. (Changing this ratio has little effect on the properties of the burners produced from the fibers.) The wetted fibers are chopped and homogenized (from about 1 to about 12 hours of stirring time with a low-shear mixer generally produces the best cosmetic results) and then dispersed in the remaining liquid gel. About 3 grams of alumina fibers per liter of gel are used.

A porosity agent is then added slowly to prevent clumping. A low-cost, water-insoluble subliming material may be used as the porosity agent. Methyl methacrylate (MMA) beads supplied by ICI Resins, produce code B728, are suitable as the porosity agent, as is camphor or any other non-soluble, subliming material. Bead sizes in the range of 400 to 25 mesh are suitable for practice of the invention. A bead size of about 40 mesh is preferred for low cost burners, since improved burner performance results from the use of a smaller bead size. A 100 to 200 mesh agent may be used in very high energy density burners and up to 400 mesh in recuperator central inward firing burners. A quantity of from about 30 to about 35 grams of MMA beads is added per liter of gel. The MMA beads initially float on the gel surface and must be folded into the liquid. The fibers and the MMA may be added independently of each other, and the order of addition seems to be unimportant. Once the components are mixed, the gel is ready to be formed into the shape required on the burner skeleton. Trapped air bubbles in the gel are undesirable and are removed by gentle agitation or by vibration of the gel.

The burner skeleton comprises a porous material such as porous ceramics, punched metal or a stainless steel screen attached to a pipe or other structure. The structure is then attached to a vacuum source. The screen is dipped into a fiber suspension, and about 2 to 8 cm Hg of vacuum is applied to "pull" the solution onto the screen. A positive pressure can be used as long as there is sufficient pressure to provide aggregation of fiber and porosity agent and allowing the liquid to be pumped through. The vacuum pulls the fluid through the burner skeleton, while the screen acts like a filter. The fibers and the MMA are trapped on the surface of the burner blank, forming an alumina base layer. Most of the excess gel is drawn through the screen and captured in a separation tank.

A small burner, such as a cylinder, about 30 cm long and about 6 cm O.D., having a power density of about 125,000 watts/$m^2$ is formed in about 10 seconds, while larger burners take longer. The skeleton coated in the base fiber layer is removed from the gel suspension and allowed to air-dry. The vacuum is maintained for about 10 to 15 seconds or more, to aid in the drying process. The used gel solution may be replenished by adding the appropriate amount of fiber and porosity agent.

Alumina fibers, which in this embodiment of the invention form the base fibers of the burner, may be replaced with any fiber that can be mechanically or chemically bonded directly to ytterbia fibers, such as ceria, yttria, yttria alumina garnet, YAG, or mixed oxide fibers. If fibers other than alumina fibers are used, which bond directly to ytterbia, holmium, ceria/thoria, or mixtures thereof, then the step of adding yttria fibers, which in this embodiment of the invention form the intermediate fiber layer of the burner, and which are described below, may be omitted.

The next step is to bond a thin layer of yttria fibers, which form the intermediate fiber layer, to the alumina fiber layer. The intermediate fiber layer provides a means of bonding the ytterbia fibers, the outer fiber layer, to the alumina fibers. Gel #2 is prepared by adding 1,000 ml of ammonium hydroxide to 1,000 grams of yttrium nitrate per liter of water, to produce an yttrium hydroxide gel. The porosity agent, about 30 to 35 grams/liter, and about 3 grams of yttria fibers/liter are added to the yttrium hydroxide gel and are blended by a process similar to that described above for alumina fibers. A thin layer, about 0.1 to 1 mm, of yttria fibers is then formed onto the alumina base fibers by drawing the yttrium hydroxide gel through the burner in the same manner as described for the alumina gel.

An alternative to using fibers such as yttria or a base layers is to coat the base fibers, such as alumina, with yttria or a layer of yttria and another layer of the emitting material, such as ytterbia containing material. Then the outer layer of fibers will bond to the coated base fiber. The process to coat the base fiber with one or more layers to enhance bonding of the outer fiber involves the use of soluble nitrate to coat the fiber by spray, dip or similar process. This coating process is the subject of a co-pending application. This coating is followed by drying and then a denitration process such as exposure to ammonia to form the hydroxide. The hydroxide is insoluble and may be bonded to directly, or the hydroxide may be partially or completely converted to the oxide first.

The next step is to form the outer fiber layer. In one embodiment of the invention, the outer fiber layer comprises mainly ytterbia. Gel #3 is made by adding 1,000 ml ammonium hydroxide to 1,000 grams of ytterbia nitrate per liter of water, to form colloidal ytterbium hydroxide, which acts as a binder. The gel may be dilute so the gel just supports the MMA. About 12 grams of ytterbia fibers per liter of ytterbium hydroxide gel are added. The fibers are blended, and about 30 to about 35 grams/liter of a porosity agent, such as MMA beads, is added. This mixture is then blended and air is removed. The burner skeleton containing alumina base and/or yttria intermediate fiber layers is immersed in Gel #3, and the ytterbium fiber layer is added as described above for the alumina fiber layer. After a few seconds, a layer of from about 2 to about 2.5 mm ytterbia fibers is formed, completing the porous ceramic fiber matrix. The outer fiber layer is preferably from about 1.5 to about 3.5 mm thick.

Figure 4A:
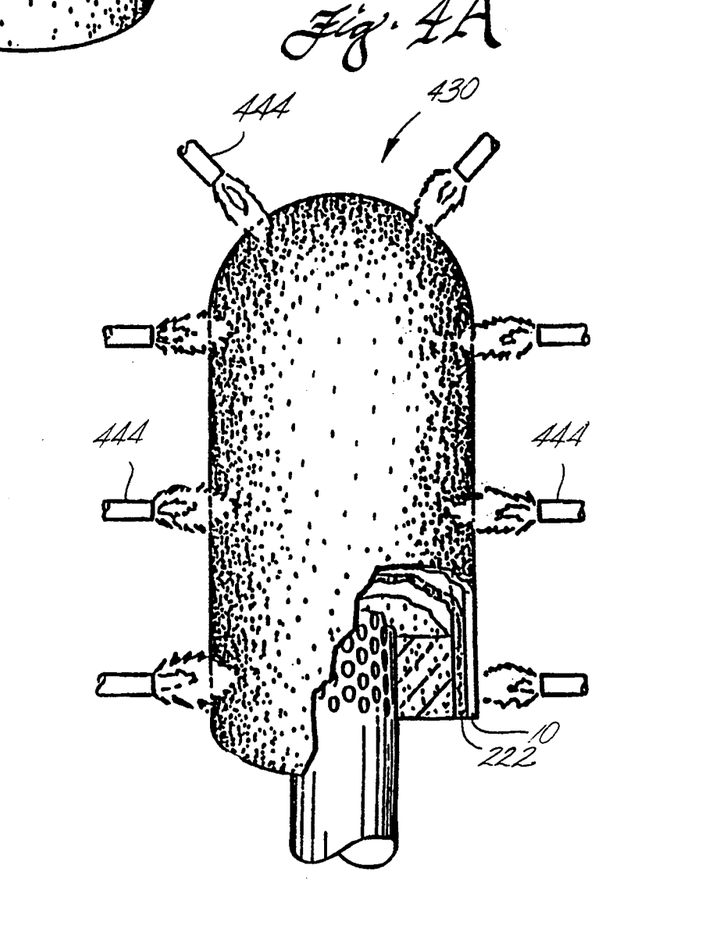
FIG. 4A is a three dimensional perspective of part of a high-wattage heat flux burner being fired to bond the ceramics near the surface.

The porous ceramic fiber matrix is dried at from about 60° C. to about 80° C. Once dry, the porous ceramic fiber matrix is heated to about 320° C., to sublime the porosity agent. After about 90% or more of the porosity agent is removed (from about 1 to about 5 hours, depending on the size of the burner and the size of the porosity agent used), the temperature is slowly raised to about 500° C., to set the ceramic binder. The outer ceramic may be heated to over 1500° C., to "set" the colloidal ytterbia. The heating may be accomplished with a torch, as shown in FIG. 4A, or other suitable means, such as burning gas on the burner surface. Preheated air may be used to increase the fiber matrix temperature. In the case of cylindrical central firing focused burners with the ytterbia layer on the inside of the cylinder, reflected radiation from the burned gas will cause self-heating and bonding of the ytterbia fibers. This occurs very quickly with very little preheating required.

While there is described the preparation of only one type of porous ceramic burner, other types, such as those for producing light, for pumping lasers, and so on, may be constructed. Different fiber layers being added to the surface of the base fiber to produce the desired effect, can also be made by practice of the invention.

One novel application of the present invention is a cylindrical burner with the fiber matrix layers being added to the interior of the burner skeleton for use in a high flux water tube type boiler.

Figure 3:
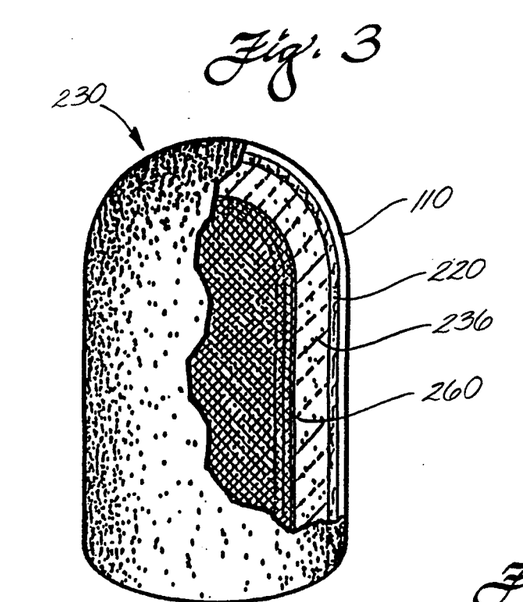
FIG. 3 is a cutaway of a high-wattage heat flux cylindrical burner which fires outward.
Figure 4B:
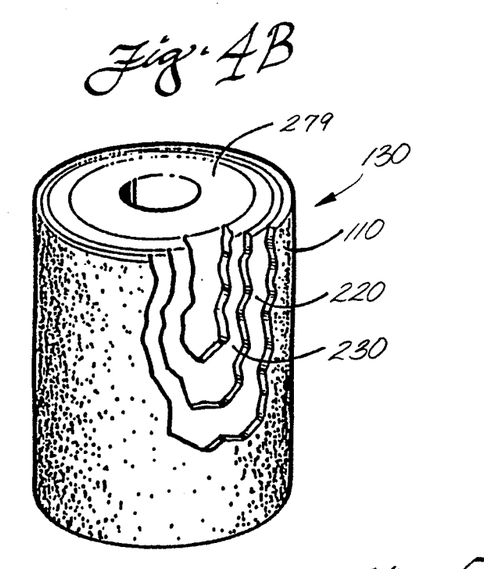
FIG. 4B represents a similar burner as shown in FIG. 4A, except that there is no heating from the outside and the core of 4B is porous ceramic instead of punched metal as shown in FIG. 4A.

FIGS. 3, 4A and 4B show high flux cylindrical outward firing burners, for example 330, 430, and 130 respectively, wherein the burners, in FIG. 3 and 4A, are formed on metal skeletons, screen 260 and punched metal, respectively, by practice of the present invention. The fiber layer 236 is formed over the screen 260 in FIG. 3. Next an intermediate layer 220 and final layer of fiber 110 are formed as illustrated in FIG. 3. FIG. 4A shows the high temperature thermal processing 444 of the outer layer 10. FIG. 4B is a vacuum form on a porous skeleton made of ceramic foam 279, first forming the base 230, middle layer 220, and finally an outer emissive layer 110.

Figure 5:
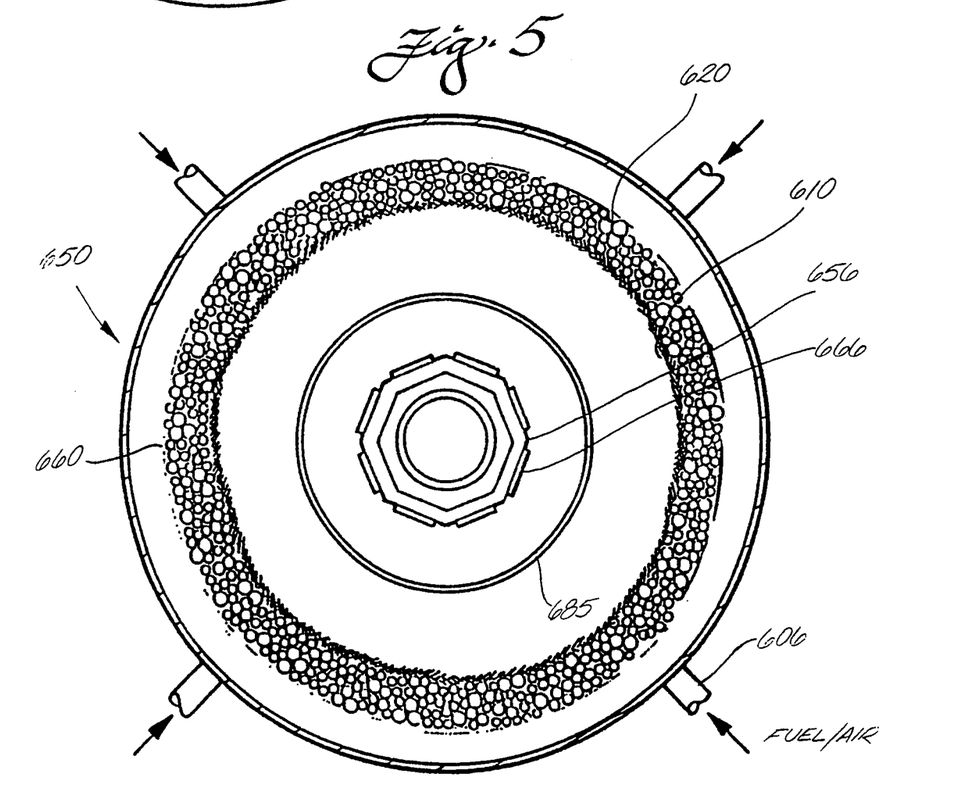
FIG. 5 illustrates the transverse sectional view of the central firing cylindrical burner using premixed gas and air.
Figure 6:
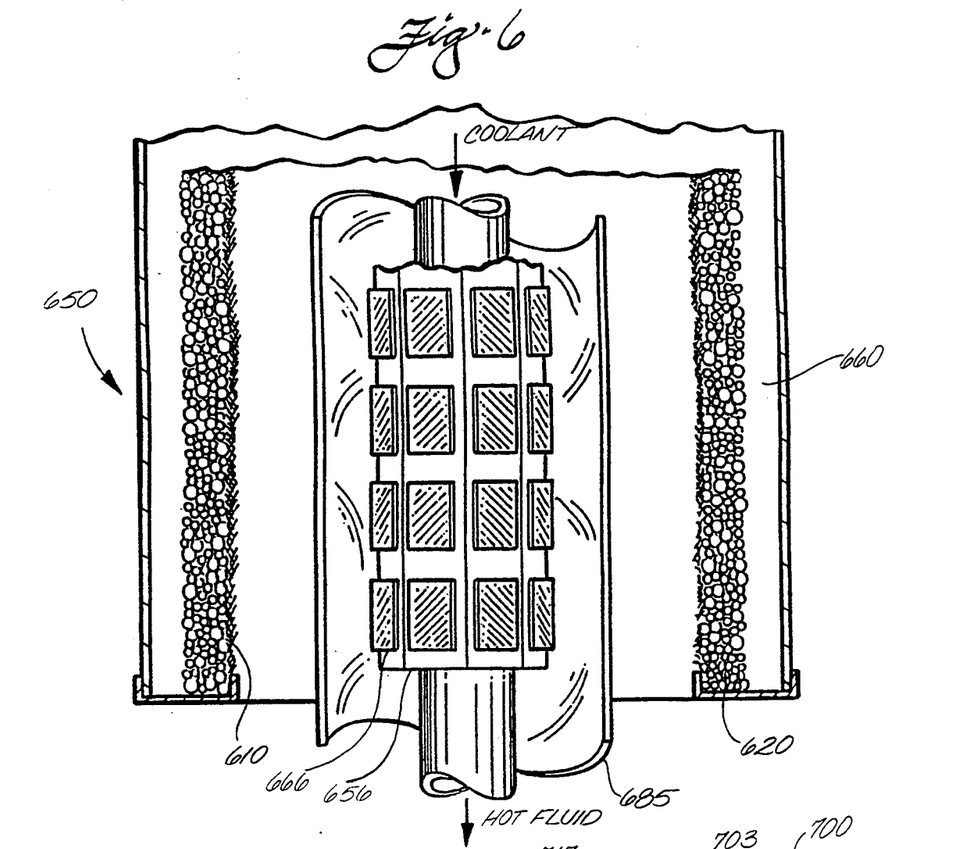
FIG. 6 shows a section of the side of a burner which is cut just outside of a photovoltaic covered center tube.

FIGS. 5 and 6 illustrate a self-powered water tube boiler 650 comprising an outer distribution chamber 660 made from heat resistant metal or other suitable material. A porous material 620 and a plurality of inlets 606 are provided, e.g., a structural porous member 620 for the introduction of air/fuel mixture from the inlets 606 to the chamber to the inner shell. Air and fuel are premixed and fed into the outer chamber (660) by a blower or by other means. The air/fuel mixture is distributed into the chamber and flows into the inner burner surface consisting of the porous ceramic skeleton 620 and porous fiber matrix 610.

The porous ceramic burner skeleton 620 comprises a material such as ceramic foam. Punched metal or a metal screen may also be used if the preheat temperature is less than the maximum available by that material. Attached to the support's inner surface is a base layer of fibers 610, such as aluminum fibers or an emissive fiber. The matrix consists of materials such as pure or mixed metal oxides of ytterbia, ceria, holmium, dysprosium, cobalt, chromium, and other spectral selective emitters, but not excluding black body emitters.

On the other hand, the base fiber layer 610 may be bonded to an intermediate fiber layer not shown in FIGS. 5 and 6 (a material such as yttria). An emissive fiber layer may be bonded directly to the ceramic skeleton 610. The surface combustion heats the emissive fiber 610 to provide the desired radiation spectra.

An ignition system (not shown) ignites the fuel/air mixture, and the fuel is combusted near the surface fiber layer of the porous ceramic burner.

In a thermophotovoltaic device (one type of application), fibers contained within the inner most layer are heated sufficiently to produce radiant energy of a narrow wavelength band. The radiant energy passes through an optical filter 685 of material such as high temperature glass quartz, alumina or sapphire, which separates combustion gases from the photovoltaic device 666. The intense focused radiant energy is capable of high-efficiency conversion to electricity when concentration type TPV cells (666) are used. This thermophotovoltaic cogenerating device comprises a plurality of photovoltaic cells 666 attached to a support tube 656 which contains a heat transfer fluid such as water, ammonia water or helium.

Either a recuperator (shown in FIG. 7 as 703) or other method of increasing the temperature of the fiber may be used to heat the fiber to a much higher temperature than can be accomplished with room temperature air. Oxygen or oxygen enrichment (not shown) may be used either by itself or in combination with the recuperator.

The cylindrical inner side firing is preferred for several applications such as thermophotovoltaic cogeneration, photochemical reaction, water heating, and other fluid heating, for example, for water heating. This design is less expensive because only one water tube need be constructed. The entire central firing focus matrix burner system unit is smaller because the higher energy density; less expensive to construct and simpler; less likely to be damaged because the fibers are protected by the outer shell and plates (not shown); and takes less floor space. The cylindrical central fired design also meets the low $NO_x$ requirements.

Figure 7:
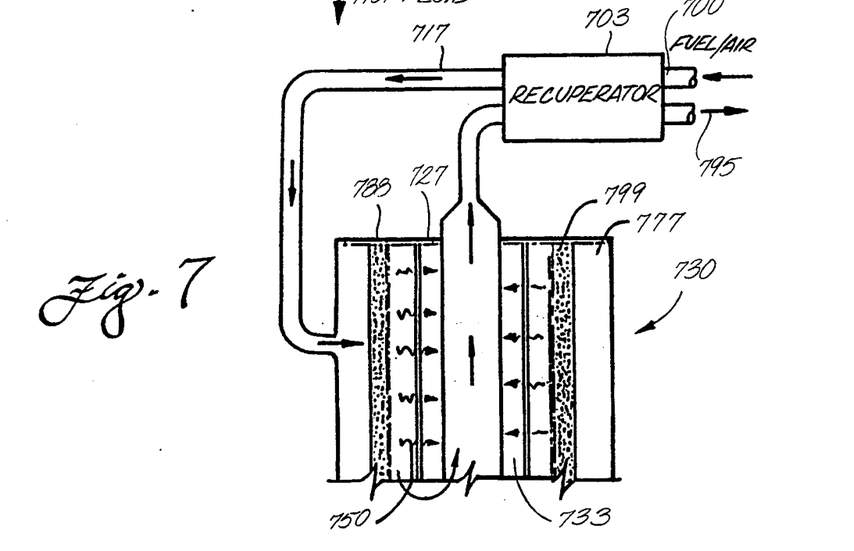
FIG. 7 illustrates the use of a low $NO_x$ catalyst with a recuperator attached to a central firing cylindrical burner.

FIG. 7 illustrates a side section of a photochemical reactor 730 of a central fired focus burner design. The fuel/air premix is fed by a blower, or other means, to the distribution chamber 777. The fuel/air mixture passes through the porous skeleton 799 into the fiber matrix 788, which consists of at least one layer of fibers. The fuel/air enters at 700 and combusts in a surface zone which may consist of special emissive fibers with a predetermined spectral character or a catalytic coating to reduce $NO_x$ or both such as $La_jMn_jO_n$, AlYCrPdO, AlYCrSmO, AlYCrNdO or similar materials. FIG. 7 shows a target material entering the intense photon zone (733) where photons 750 are directed upon the target material 727 flowing through the chamber and being converted to the product. The exhaust gases 795 are directed down and then up through the center of the reactor 730.

FIG. 7 also illustrates the use of a recuperator 703 which may also contain a catalyst to reduce $NO_x$. The exhaust passes through the recuperator 703 and transfers energy to the fuel/air mixture to increase the temperature of the combustion zone and then through the radiation output 750 to the exhaust 795. The recuperator may also be used to preheat the air to well above the autoignition point as implied in FIG. 8 below.

Figure 8A:
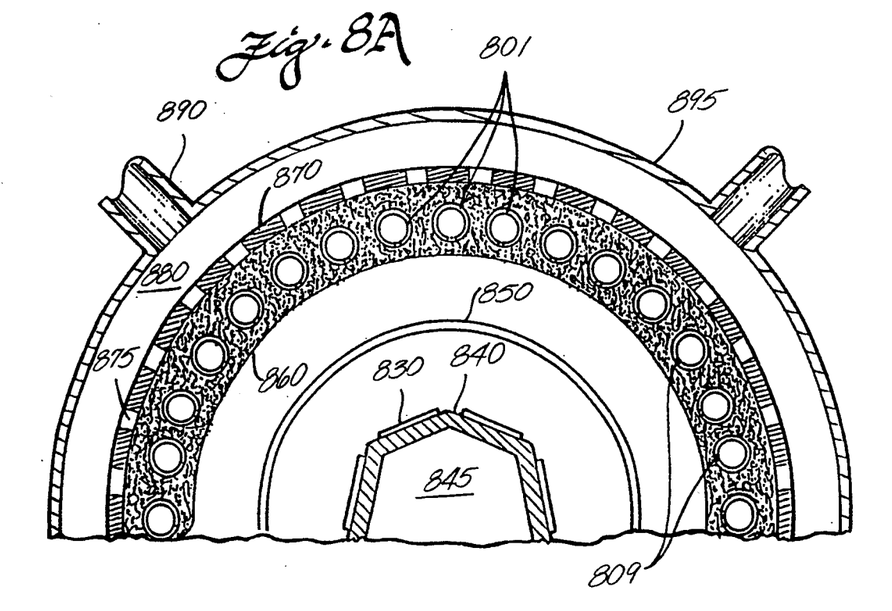
FIG. 8A is a cutaway view of one half of the fuel injection fiber matrix burner design. This section is cut through the top.
Figure 8B:
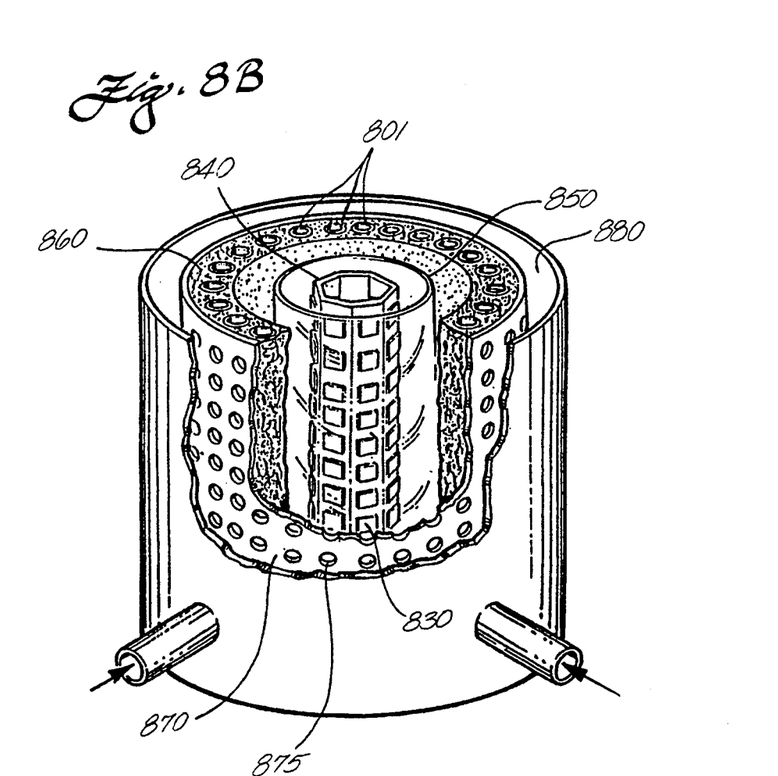
FIG. 8B shows the perspective view of the burner with a side wall visible for clarity.

FIGS. 8A and 8B illustrate a cylindrical inner-side central focused firing burner with fuel injection. The fuel is brought in to the fiber matrix combustion region by tubes 801, each of which contain small openings 809 such as slots or holes to emit the gas. This distribution system allows for fuel injection. The fuel injection prevents preignition when the air is heated to above the autoignition temperature.

An oxidant such as oxygen or air may be used at temperatures well above the ignition point, making recuperation and fuel injection efficient and practical. The recuperator, not shown in FIG. 8, may contain a catalytic surface which may be used to further reduce $NO_x$. This surface may consist of a coating on the heat exchanger surface or a catalytic bed. Also the air may be replaced with or enriched with oxygen to further increase the temperature of combustion and the watts/$m^2$ output of this design. The recuperator provides a method to significantly increase efficiency by recycling the energy in the exhaust products.

Operation of the central focus firing cylindrical burner with fuel injection as depicted in FIGS. 8A and 8B is as follows. The hot oxidant 881 enters the outer distribution chamber 880 having outer wall 895 via inlets 890 under pressure and flows through the porous structural member 870 thus connecting holes or pores such as 875 to the fiber matrix 860 in which the fuel injection tubes 801 are located. The fuel enters the fiber matrix 860 through fuel injection tube holes 809. The exhaust products move through the exhaust chamber 818. The photovoltaic cells 830 are protected from the combustion products by a filter 850. The narrowband radiation passes through the filter 850 and focuses on the photovoltaic cells 830. A fluid 845 flows inside the heat exchanger tube 840 to cool the TPV cells 830 and provide thermal energy to some other source such as a heat pump, boiler, water heater, turbine, etc.

Another application of the thermally amplified and stimulated emission radiator (THASER ™) is lighting. In the case of using the THASER ™ for light production, an outside fired tube may be more appropriate. Another application not shown is cooking. In the case of cooking on a range, flat round shaped burners may be the most appropriate; however, there are both cooking and photon emitting applications in which the cylindrical inner firing concept may be used effectively.

The photovoltaic cells are capable of efficiently capturing only wavelengths at or just above their band gap. In "gray body" radiators at 1000° C., the quantum efficiency is from about 4 to about 6 percent, where quantum efficiency is defined as the ratio of the photogenerated carriers to the photon flux incident on the photovoltaic device. Three similar fiber matrix burners (outside firing cylinders similar to FIG. 3 about 30 cm long and about 7 cm. in diameter) are compared below, at the same input of natural gas. Each was measured using the same photovoltaic panel.

| Material | Power (watts) |
| --- | --- |
| Ytterbia fibers | 9.90 |
| Alumina fibers | 0.036 |
| Near-blackbody | 0.336 |

The comparison indicates that the superemitter burner produces about 30 times more power than that of a near-blackbody burner.

The advantages of the high-temperature ceramic material of the present invention are that they: (1) are relatively inexpensive to construct, (2) are strong, (3) are durable, (4) are highly porous, (5) produce low levels of $NO_x$, (6) achieve high radiation power densities of desired spectral wavelengths(s), and (7) have high-temperature capability.

The porous ceramic burners of the present invention are capable of a power density from as low as 60,000 watts/m$^2$ to greater than 1,250,000 watts/m$^2$ while maintaining low $NO_x$ emissions. Oxygen may be substituted for air, in that case zero $NO_x$ is measured and the recuperator need only be very small, saving money.

Figure 10A:
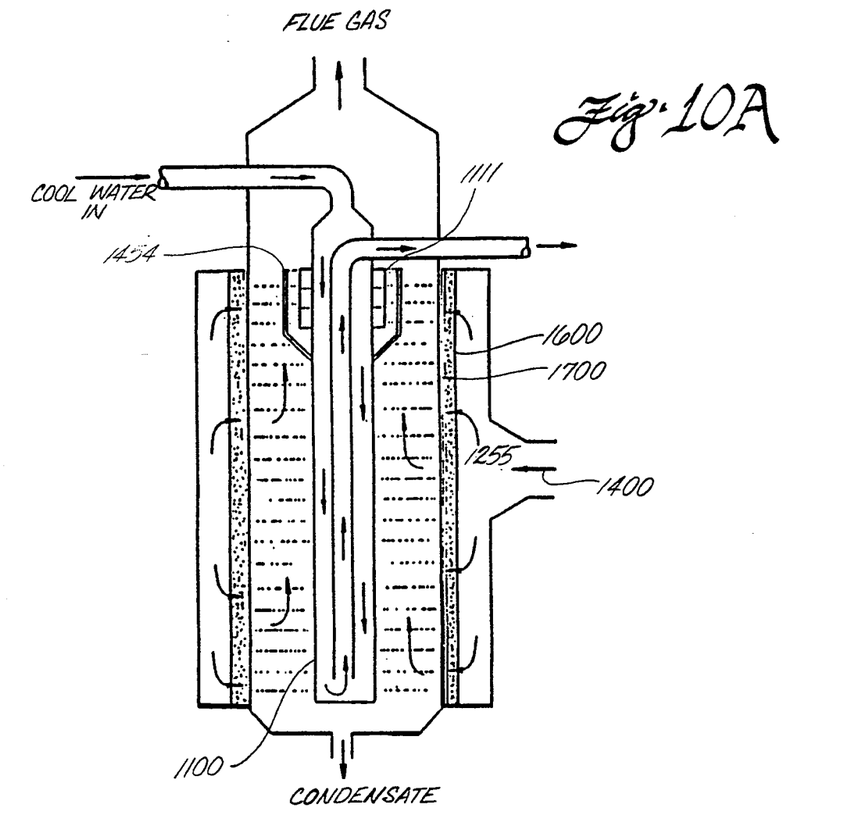
FIG. 10A illustrates a self-powered large industrial boiler which uses only a small length of the heat exchanger tube for photovoltaics. The remainder of the tube may be exposed directly to the combustion products.
Figure 10B:
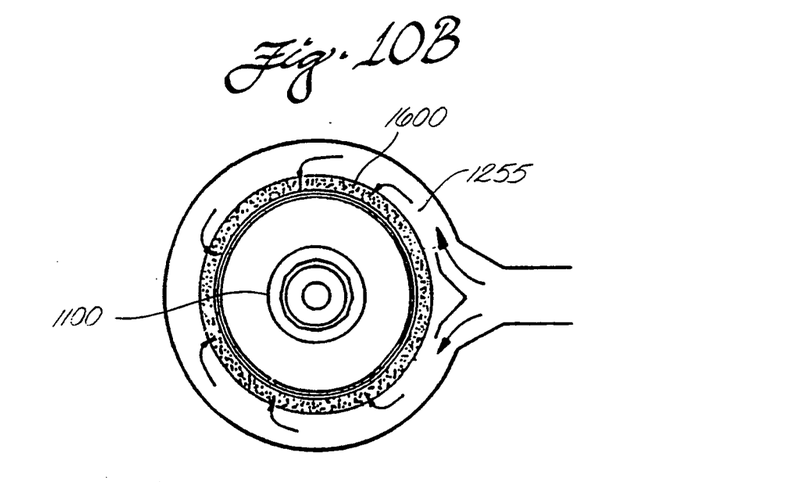
FIG. 10B illustrates a top view of the self-powered boiler.

FIG. 10 illustrates a self-powered boiler deriving its electrical energy from photovoltaics (1111) placed on a small section of the heat exchanger tube 1100 near the center of the burner. This boiler/water heater may be designed with only one heat exchanger tube 1100, or more than one. The premix air/fuel 1400 enters the chamber 1255, passes through the structure skeleton 1600, through the superemitting fiber matrix 1700, thereby heating the surface to provide incandescent superemitted radiation 1800. The radiation powers the TPV cells 1111 by passing through the heated barrier filter 1454. The heat exchanger 1100 may contain vertical fins, not shown.

Other preferred embodiments of the invention are capable of delivering high photon fluxes. Selected wavelength bands may be used to match the silicon photovoltaic band gap of about 1,000 nm. The useful photon fluxes of the burners are many times those produced by conventional surface burners and may be easily delivered to a variety of targets, such as photovoltaic cells, chemical reactors, cooking, heating devices, and optical collection means for lighting or growing plants and pumping other devices such as lasers. High efficiencies of 10% to 60% in the wavelength bands that enhance plant growth promise to replace electric green house lamps. The mixtures of Ce(0.4% to 3%), Sm(0.5% to 5%) and thorium with ytterbium have been shown to produce the most intense light for growing crops, flowers, and plants and at the same time providing the required long life and durability under high temperature performance needed to produce the light with an efficiency over 4%.

Figure 9:
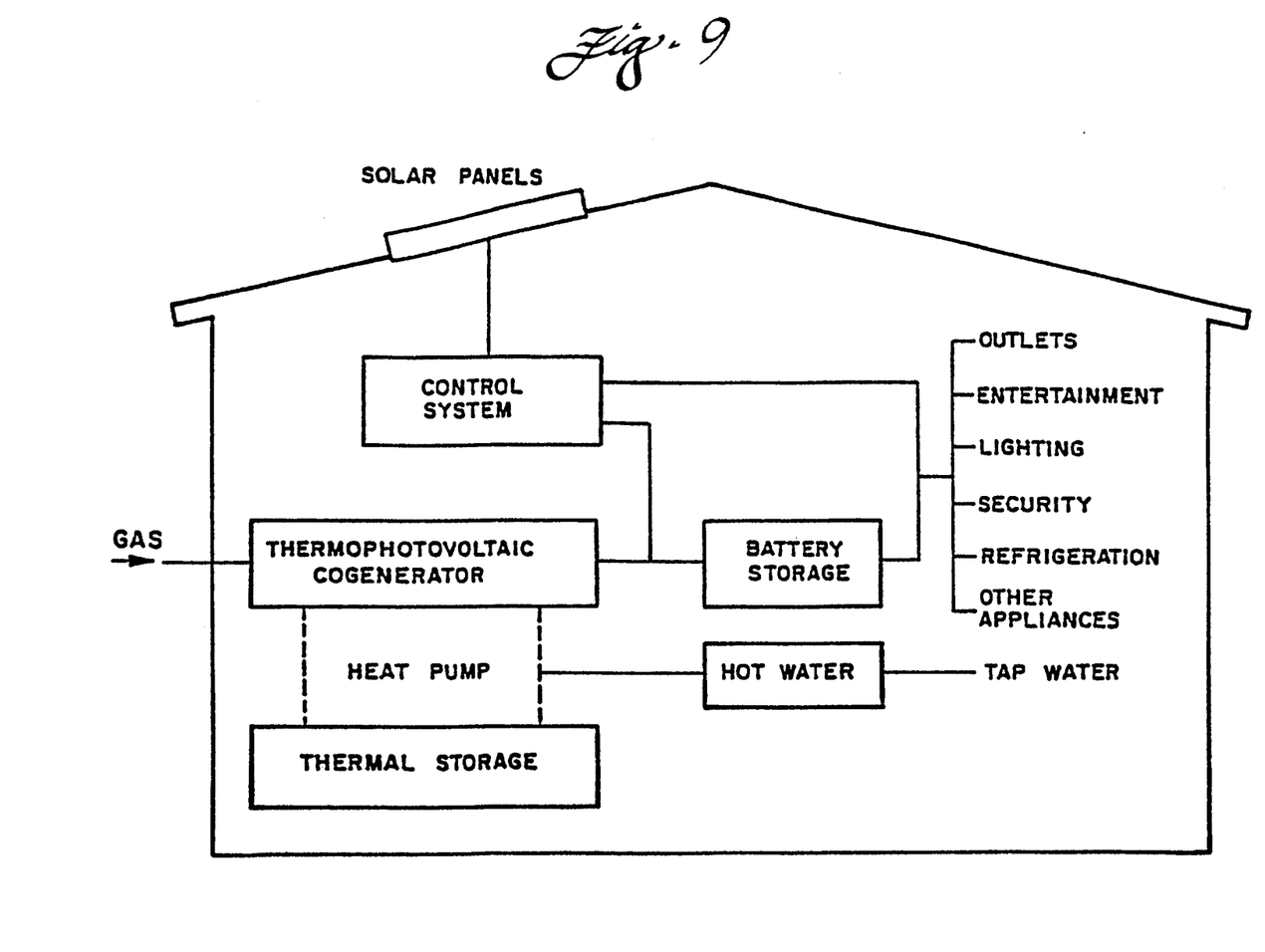
FIG. 9 shows schematically a small scale residential size cogeneration system (interfaced with solar cells), using thermophotovoltaic technology as the major source of thermal and electrical energy.

FIG. 9 schematically illustrates the Small-scale Managed Advanced Residential Thermophotovoltaic (SMART) energy system which interfaces with a thermal actuated heat pump. The SMART energy system is a method to dramatically reduce energy cost and reduce insults to the environment. The SMART energy system uses the principle of cogeneration; i.e., instead of using a central power plant that generates electricity and discards almost ⅔ of its energy in the form of thermal pollution; the SMART energy system uses the thermal energy for space conditioning, hot water, and to meet other thermal requirements.

The economics of this system depends on the proper sizing of thermal and electrical storage, so the thermophotovoltaic cogeneration can be sized as small as possible. A typical peak load of a home with a family of 4 is about 6 kilowatts; however, using an Advanced Managed Power System developed by William Wilhelm (formerly of Brookhaven National Laboratory, now President of Alkem Research and Technology), the thermophotovoltaic cogeneration unit may be reduced to a size that is competitive with the initial capital costs of conventional technologies. Some preliminary estimates from a study at Brookhaven National Laboratory show a 50% reduction in the current cost of electricity using the SMART energy system. The basic concept of electrical generation and storage appeared many years ago in a Brookhaven National Laboratory report dealing with fuel cells. A very similar system is shown in FIG. 9.

The house with a SMART energy system is supplied with a fuel such as natural gas. The gas is converted to electric power and heat by means of a special cogenerator. This cogenerator uses thermophotovoltaic technology; i.e., by heating an emissive material to incandescence the electromagnetic radiation (light) produced is then converted to electricity by a direct conversion device such as a solar cell. The space heat from the process is used to provide thermal energy for a variety of applications such as to heat or cool and providing hot water.

The brains of the SMART energy system is the Advanced Managed Power System developed by Bill Wilhelm. This management system makes it possible to reduce the size of the thermophotovoltaic (TPV) cogenerator from 6 kwe to about 0.5 kwe. This size reduction has a major impact on the economics. Preliminary estimates indicate about $0.50 to $1.00 per watt cost for the TPV cogenerator when sized at the 1000 watts electric level, 15% electrical efficiency, and overall efficiency above 75%. This overall efficiency is twice that from a typical power plant. The Advanced Managed Power System is the brains of the system, it stores some of the electrical energy in lead acid batteries (electrolyte starved type can handle 3,000 deep cycles). The thermal energy from the TPV unit is also stored in a thermal storage system either hot or cold. The brain computes the amount of thermal storage to minimize energy consumption and manages the battery storage and withdrawal to maximize the battery system life. The SMART energy system is believed to have tremendous advantages over conventional energy systems which include a combination of power plant, furnace, hot water heater, etc.

The advantages include:
1. Conserve ½ of fuel
2. Reduce insult to the environment
3. Reduce electricity cost
4. Reduce thermal energy cost
5. Increase jobs in U.S.A.
6. Decrease balance of payment problem
7. Increase national security The benefits to the nations are so great that one can envision tax incentives to stimulate the small scale cogeneration market. This technology will most certainly create many new jobs and industries in addition to expanding and revitalizing the lead industry (which is dominated by the U.S. lead mining and battery industry, as well as the American appliance industry).

The above claims are based on an estimate of the efficiency of the TPV fuel injection central fired burner system which follows. The principle that electromagnetic emissions increase dramatically with temperature has been well established in physics by Stefan e.g. with the equation $I_{(t)} = \sigma \epsilon T^N$ when $\sigma$ is constant, $\epsilon$, the causivity, is a number between 0 and 1, and N equals 4 for a near blackbody. Using this principle, an estimate of power potential using data from a TPV water heater project is that 40 watts is attainable in this configuration without recuperation. Recovering some of the exhaust gas energy could raise the pre-combustion gas temperature to about 500° C. and does not require fuel injection. The intensity of light emission goes up with the 10th power for similar materials. Nelson estimates that emission for ytterbia increases with the 8th power of temperature. We estimate that the emissive fibers are currently running at about 1500° K. If we assume that recuperation raises fiber temperature to 1750° K., an increase of 344% is calculated. In other words, 137.6 watts would be attainable using the recuperation concept to raise the temperature and then the power output.

The idea of inverting the burner system to central fire has two main benefits: it increases the ratio of emissive surface area to collector area, thus reducing the number of photovoltaics required because a higher photon flux can be obtained; and this configuration also lends itself to a more compact design which will cost less, take less space and be more durable.

The TPV water heater project uses an emitter/collector pair that is based on silicon as the collection media because of its availability. A holmium emitter has shown the ability to produce more than twice of the absolute radiant intensity of the estimated ytterbia as shown in FIG. 1. The advanced photovoltaic materials (InGaAs) for this emitter are twice as efficient as silicon in converting ytterbia energy to electrical power. Using the 137.6 watts from FIG. 1 as a basis, 743 watts are estimated to be attainable using the advanced emitter/collector pair.

The recuperation temperature of an air/fuel gas mixture is limited by its combustion temperature. For natural gas in air, this point is somewhere below 800° C. In order to increase the emissive fiber temperature using recuperation, it is desirable to have the combustion air as hot as possible without preignition of the mixture. FIG. 8 depicts a configuration where natural gas is injected through porous tubes into the combustion zone. The recuperated air can then be 1000° C. without fear of preignition. If we assume the emissive fibers are 250° C. hotter than the situation in FIG. 6 that produced 743 watts, a possible 2162 watts is calculated. The efficiency is over 20%. Careful electrical design of heat exchangers and heat pumps shown in FIG. 9 can lead to an overall efficiency of 60% to 70%, which is twice that of the power plant system.

The above descriptions of exemplary embodiments of the preparation of a porous ceramic burner and the use of such burners are for illustrative purposes. Variations will be apparent to those skilled in the art. Therefore, the present invention is not intended to be limited to the particular embodiments described above. The scope of the invention is defined in part by the following claims.

What is claimed is:

1. A thermophotovoltaic device comprising:
   a porous ceramic burner comprising:
   a base fiber layer which is porous allowing combustion gas and air to pass through it, selected from the group consisting of silicon dioxide, aluminum oxide, gallium oxide, thorium oxide, yttrium oxide, erbium oxide, zirconium oxide, or other metal oxides or mixed metal oxides, borides, nitrides, carbides, and silicides;
   an outer fiber layer which is thermally stimulated to emit radiation of specific wavelengths above a threshold temperature;
   a photovoltaic collector matched to the emitter for selectively absorbing radiation in the same wavelength band as emitted by the emitter; and
   a means to remove heat from the photovoltaic collector.

2. A device as recited in claim 1 wherein at least a portion of the fibers of the base fiber layer or the outer fiber layer are manufactured by a relic process, comprising a denitration step to form at least one metal oxide selected from the group consisting of silicon dioxide, aluminum oxide, gallium oxide, thorium oxide, yttrium oxide, erbium oxide, zirconium oxide, holmium oxide, ytterbium oxide, and chromium oxide.

3. The device recited in claim 1 wherein the outer layer fibers are impregnated with metal oxides selected from the group consisting of thorium oxide, holmium oxide, ytterbium oxide, thulium oxide, and cerium oxide.

4. The device recited in claim 1 further comprising an intermediate fiber layer between the base fiber layer and the outer fiber layer to bond the outer fiber layer to the base fiber layer.

5. The device recited in claim 4 wherein the intermediate layer fibers are impregnated with metal oxides selected from the group consisting of yttrium oxide, uranium oxide, thorium oxide, ytterbium oxide, gallium oxide, erbium oxide, holmium oxide, zirconium oxide, and chromium oxide.

6. A central firing symmetrically designed porous ceramic burner comprising:
   a base fiber layer of fibers selected from the group consisting of oxides, carbides, nitrides or mixed oxides,
   a surface fiber layer which is thermally stimulated to emit radiation of a specific wavelength above a threshold temperature wherein the burner produces about 30,000 to 3,000,000 watts/m$^2$.

7. A device as claimed in claim 6 in which the design of the burner is cylindrical with the surface combustion zone focused on a central target zone.

8. A device as in claim 6 which also produces less than 20 ppm NOx.

9. The porous ceramic burner recited in claim 6 wherein the surface layer fibers are doped with metal oxides selected from the group consisting of chromium oxide, cobalt oxide, cerium oxide, erbium oxide, zirconium oxide, holmium oxide, ytterbium oxide, and any other metal oxide which produces inner electron shell transitions when heated to a predetermined temperature.

10. The porous ceramic burner recited in claim 6 wherein the surface layer fibers are doped with metal oxides selected from the group consisting of thorium oxide, holmium oxide ytterbium oxide, thulium oxide, cerium oxide, and other metal oxides that emit a characteristic wavelength upon heating.

11. The porous ceramic burner recited in claim 6 further comprising an intermediate fiber layer between the base fiber layer and the surface fiber layer to bond the surface fiber layer to the base fiber layer.

12. A central fired cylindrical fiber matrix burner designed to emit radiation comprising:
an outer distribution shell in which an air-fuel mixture is passed from an outer structural shell to an inner porous structural shell;
a fiber matrix attached to the inside of the inner structural shell for supporting a combustion zone in which combustion takes place on the surface of the fiber matrix; and wherein
combustion products are focused on a central heat exchanger allowing conduction and convection heating from the combustion products to the heat exchanger, and further comprising
heat exchanger material for absorbing radiation produced by the central fired cylindrical fiber matrix.

13. A water tube type boiler comprising a burner as claimed in claim 12 further comprising a tube containing water, the tube being near the center of the cylindrical burner and heated by radiation and combustion.

14. A cogeneration device comprising a burner as claimed in claim 12 further comprising photovoltaic cells and a transparent tube near the center of the cylindrical burner for protecting the photovoltaic cells from the combustion products by diverting exhaust products and allowing radiant energy to pass through the tube to provide energy to the photovoltaic cells.

15. A cogeneration device as claimed in 14 further comprising a recuperator to provide higher temperature combustion air thereby increasing the combustion temperature.

16. A cogeneration device as claimed in 15 further comprising a low NOx catalyst.

17. A selective emitting radiation device comprising a burner as claimed in claim 12 further comprising ceramics which emit selected bands of radiation to provide photons to a target area in the central zone of the device.

18. A selective emitting device as claimed in claim 17 further comprising a photovoltaic system to provide electric power.

19. A cogeneration device which produces electric power and heat comprising a device as claimed in claim 12 further comprising:
an oxygen enrichment means to heat the fibers; and
a photovoltaic cell system mounted on the heat exchanger in the central zone of the cylindrical central firing radiant burner.

20. A cogeneration device as claimed in 12 further comprising separate fuel air chambers, provided to keep the fuel and air separated until combustion in the desired zone of the emitting fiber occurs and means to preheat the air to above the autoignition point of the fuel air mixture.

21. A combustion device including a porous ceramic burner comprising:
a base fiber layer which is porous for allowing combustion gas and air to pass through the burner;
an outer porous fiber layer adhered to the base fiber layer including at least one element which is thermally stimulated to emit radiation of specific wavelengths above a threshold temperature; and
means for introducing fuel and air through the base fiber layer for combustion adjacent to the outer fiber layer.

22. A device as recited in claim 21 wherein the base fiber layer is formed of fibers selected from the group consisting of silicon dioxide, aluminum oxide, gallium oxide, thorium oxide, yttrium oxide, erbium oxide, and zirconium oxide.

23. The device recited in claim 21 wherein the outer layer fibers are impregnated with metal oxides selected from the group consisting of thorium oxide, holmium oxide, ytterbium oxide, thulium oxide, and cerium oxide.

24. The device recited in claim 21 further comprising an intermediate fiber layer between the base fiber layer and the outer fiber layer for bonding the outer fiber layer to the base fiber layer.

25. The device recited in claim 24 wherein the intermediate layer fibers are impregnated with at least one metal oxide selected from the group consisting of yttrium oxide, uranium oxide, thorium oxide, ytterbium oxide, gallium oxide, erbium oxide, holmium oxide, zirconium oxide, chromium oxide.

26. The porous ceramic burner recited in claim 21 wherein the outer layer fibers are doped with metal oxides selected from the group consisting of chromium oxide, cobalt oxide, cerium oxide, erbium oxide, zirconium oxide, holmium oxide, ytterbium oxide, and any other metal oxide which produces inner electron shell transitions when heated to a predetermined temperature.

27. A device as claimed in claim 21 in which the burner is a hollow cylinder with the outer fiber layer being formed on the inside surface of the hollow cylinder.

* * * * *